United States Patent
Tilly et al.

(10) Patent No.: US 9,137,236 B2
(45) Date of Patent: Sep. 15, 2015

(54) METHOD AND SYSTEM FOR REDUCING THE IMPACT OF AN UNDESIRED EVENT USING EVENT-BASED DISTRIBUTION OF CERTIFICATES

(75) Inventors: Lars Tilly, Limhamn (SE); Stefan Gripwall, Helsingborg (SE)

(73) Assignee: Zaplox AB, Lund (SE)

( * ) Notice: Subject to any disclaimer, the term of this patent is extended or adjusted under 35 U.S.C. 154(b) by 205 days.

(21) Appl. No.: 13/883,846

(22) PCT Filed: Nov. 8, 2011

(86) PCT No.: PCT/SE2011/051332
§ 371 (c)(1),
(2), (4) Date: Jun. 11, 2013

(87) PCT Pub. No.: WO2012/064264
PCT Pub. Date: May 18, 2012

(65) Prior Publication Data
US 2013/0265167 A1    Oct. 10, 2013

(30) Foreign Application Priority Data

Nov. 9, 2010 (SE) ........................... 1051172
Nov. 9, 2010 (SE) ........................... 1051173

(51) Int. Cl.
| | | |
|---|---|---|
| G08B 17/00 | (2006.01) |
| H04L 29/06 | (2006.01) |
| G07C 9/00 | (2006.01) |
| G08B 21/18 | (2006.01) |
| G08B 23/00 | (2006.01) |
| G08B 13/00 | (2006.01) |
| G08B 21/00 | (2006.01) |
| H04L 29/08 | (2006.01) |

(52) U.S. Cl.
CPC ........ *H04L 63/0823* (2013.01); *G07C 9/00103* (2013.01); *G08B 21/182* (2013.01); *H04L 63/062* (2013.01); *H04L 63/068* (2013.01); *G08B 13/00* (2013.01); *G08B 17/00* (2013.01); *G08B 21/00* (2013.01); *G08B 21/18* (2013.01); *G08B 23/00* (2013.01); *H04L 63/064* (2013.01); *H04L 63/08* (2013.01); *H04L 63/108* (2013.01); *H04L 67/12* (2013.01)

(58) Field of Classification Search
None
See application file for complete search history.

(56) References Cited

U.S. PATENT DOCUMENTS

| 5,979,754 A | 11/1999 | Martin et al. |
| 7,057,507 B1 * | 6/2006 | Sandifer ............... 340/531 |

(Continued)

FOREIGN PATENT DOCUMENTS

| EP | 0 714 018 A2 | 5/1996 |
| GB | 2 310 068 A | 8/1997 |

(Continued)

*Primary Examiner* — Julie Lieu
(74) *Attorney, Agent, or Firm* — Harness, Dickey & Pierce, PLC

(57) ABSTRACT

The present invention relates to a method and a system for reducing overflow caused by an appliance (100) using a liquid. The system comprises: a detector (200) arranged to detect if the appliance (100) has undesirably emitted part of the liquid, an internal server (300) being arranged to generate an alarm event in case the appliance (100) has undesirably emitted part of the liquid, and an external server. The external server is arranged to send, via a cellular network, a certificate to a predetermined first party in case an alarm event is generated. The certificate authorizes the first party to enter the location in which the appliance is located.

14 Claims, 2 Drawing Sheets

(56) References Cited

U.S. PATENT DOCUMENTS

| | | |
|---|---|---|
| 7,391,319 B1 | 6/2008 | Walker |
| 2005/0044402 A1* | 2/2005 | Libin et al. ............ 713/200 |
| 2005/0275547 A1* | 12/2005 | Kates ..................... 340/605 |
| 2006/0137090 A1 | 6/2006 | Jeffries et al. |
| 2006/0191324 A1 | 8/2006 | Garabedian et al. |
| 2009/0015370 A1* | 1/2009 | Rowse ..................... 340/5.2 |
| 2013/0120109 A1* | 5/2013 | Libin et al. .............. 340/5.7 |

FOREIGN PATENT DOCUMENTS

| | | |
|---|---|---|
| WO | WO-03/023722 A2 | 3/2003 |
| WO | WO-2005/080720 A1 | 9/2005 |

\* cited by examiner

METHOD AND SYSTEM FOR REDUCING THE IMPACT OF AN UNDESIRED EVENT USING EVENT-BASED DISTRIBUTION OF CERTIFICATES

CROSS-REFERENCE TO RELATED APPLICATIONS

This application is a 371 U.S. National Stage of International Application No. PCT/SE2011/051332, filed on Nov. 8, 2011, which claims priority to Swedish Patent Application No. 1051172-3, filed Nov. 9, 2010, and Swedish Patent Application No. 1051173-1, filed Nov. 9, 2010, the contents of which are hereby incorporated by reference in their entirety as if fully set forth herein.

TECHNICAL FIELD

The present invention relates to a method and a system for reducing overflow caused by an appliance using a liquid.

BACKGROUND ART

There is always a risk that, e.g., a dishwasher and/or a washing machine overflows. If this happens when the owner is not at home, the entire home can be flooded resulting in enormous damages. Other appliances that could overflow are, e.g., an oil boiler or a water softening plant. Thus, such problems are encountered not only by house owners and landlords, but also by manufacturers and business owners.

Insurance companies are very strict in their disbursements and the insured party must usually be able to show all due care. Thus, if the insured party would like to run the appliance unguarded, it could result in a very costly experience.

SUMMARY OF THE INVENTION

In view of the above, an objective of the invention is to solve or at least reduce one or several of the drawbacks discussed above. Generally, the above objective is achieved by the attached independent patent claims.

According to a first aspect, the present invention is realized by a method for reducing overflow caused by an appliance using a liquid. The method comprises: detecting if the appliance has undesirably emitted part of the liquid, and generating an alarm event if the appliance has undesirably emitted part of the liquid and, sending a certificate, via a cellular network, to a predetermined first party, wherein said certificate authorizes said first party to enter the location in which said appliance is located.

By a certificate is generally meant a digital authorization. In particular, the certificate is a digital authorization which authorizes a person to enter a location. The certificate may hence be thought of as a digital key.

This is advantageous in that the overflow is detected which implies that the overflow damages can be reduced. The appliance may be a household appliance. The household appliance may, e.g., be a washing machine or a dishwasher.

This is further advantageous in that the first party is able to reduce overflow damages. The first party may, e.g., be the owner, the tenant, or the landlord of the appliance and/or of the location in which the appliance is located. Alternatively, the first party may be a predetermined company, e.g. a craftsman company. As a further alternative, the first party may be a server. The server can then forward the certificate.

The certificate may be sent by an external server. The external server may further generate the certificates. The certificates may be sent to a mobile communication device of the predetermined first party.

The cellular network is advantageous in that it is robust, has a low uptime compared to ADSL, it is difficult to "cut a wire" and difficult to tap.

The predetermined first party may be a craftsman. The craftsman may be a plumber.

Alternatively, the predetermined first party may be a first server and the first server may select a second party from a predetermined list and forward the certificate to the second party. The predetermined list may for example be provided to the first server by the owner of the appliance. The second party may be a mobile communication device.

Further, the first server may select a second party based on which party on the predetermined list is geographically closest to the location in which the appliance is located using Global Positioning System technique.

The method may further comprise sending a lock/unlock command comprising said certificate from a mobile communication device to an internal server, if the internal server validates the mobile communication device: the internal server sending a lock/unlock command to a lock module arranged at the location in which the appliance is located, the lock module locking/unlocking so that the predetermined first party can enter the location, wherein the lock/unlock command from the mobile communication device to the internal server is sent via a cellular network. This is advantageous in that the first party can enter the location and can reduce overflow damages without having a mechanical key. Moreover, if the mobile communication device is lost, the access for that specific mobile communication device is easily restricted which further increases the security. Furthermore, the method enables remote locking/unlocking of the lock module.

The certificate may be limited in time. For example, the certificate may only be valid for a few hours or during business hours. This is advantageous in that the security is increased since the first party is only authorized to enter the location during the limited time the certificate is valid. The internal server or an external server may be arranged to limit the certificates in time.

The method may further include revoking the certificate. The revoking of the certificate may be performed either by the predetermined first party or by the internal server. Alternatively, the external server may revoke the certificate. This is advantageous in that the security is further increased. By revoking a certificate, is meant that the certificate is invalidated. In other words, the certificate may no longer be used to authorize a person to enter a location. In this way, previously generated certificates or certificates which have been lost may be revoked such that they may no longer be used by a person to enter a location.

The method may further comprise signing the lock/unlock command and/or the certificate with a digital authentication key. The signing of the lock/unlock command may be performed by the mobile communication device. This is advantageous in that it further increases the security of the method since lock/unlock commands cannot be sent without having both a valid certificate and a signing key.

The digital authentication key comprises information identifying the mobile communication device. This is advantageous in that the signing provides information on from which mobile communication device the lock/unlock command was sent. The digital authentication key may be generated by the external server and sent to the predetermined first party.

The certificate may be associated with the digital authentication key. The certificate may certify the authenticity of the digital authentication key. The authenticity may be guaranteed by a certificate provider which is associated with the external server. The signing key could, e.g., be encrypted with a public key of the certificate provider.

The external server may use a digital identification when generating the certificate and/or the digital authentication key. This is advantageous in that the security is even more increased. The identification may, e.g., be information stored in a magnetic striped card used in conjunction with a card reader. Alternatively, the identification may be an electronic identification provided by, e.g., a bank. As a further alternative, the identification may be of analogue type, i.e., the identification is at least one one-time code provided on a piece of paper.

The step of detecting if the appliance has undesirably emitted part of the liquid may comprise sensing in a humidity detector a level of humidity. The step of generating an alarm event if the appliance has emitted part of the liquid may be: generating an alarm event in case the level of humidity is larger than a predetermined value. This is advantageous in that it can be easily detected if the appliance leaks.

The step of detecting if the appliance has undesirably emitted part of the liquid may be detecting how much liquid flows into the appliance per unit of time and sending the detected information, via a short range wireless protocol, to the internal server, computing the amount of liquid that has flown into the appliance at a certain point of time. The step of generating an alarm event if the appliance has undesirably emitted part of the liquid may be generating an alarm event in case the amount of liquid that has flown into the appliance at a certain point of time is larger than a predetermined value. This is advantageous in that an overflow can be detected quickly and with a good accuracy.

The step of generating an alarm event may comprise sending a shut off instruction, via the short range wireless protocol, to a switch for operating an inflow of the liquid into the appliance, and the switch shutting off the inflow of the liquid into the appliance. This is advantageous in that the overflow damages can be reduced. The switch can, e.g., be arranged at the main inflow pipe so that the inflow of the liquid into the location in which the appliance is located is shut off. Alternatively, the switch can be arranged at the inflow pipe of the appliance so that only the inflow into the appliance is shut off, and not the inflow of the liquid into the location in which the appliance is located.

The step of generating an alarm event may comprise sending a message, via the cellular network, to a predetermined third party comprising information about which appliance has caused the alarm event to be generated. This is advantageous in that the first party is notified and can take appropriate action in order to reduce overflow damages. The first party may, e.g., be the owner, the tenant, or the landlord of the appliance and/or of the location in which the appliance is located. Alternatively, the first party may be a predetermined company, e.g. a craftsman company. As a further alternative, the first party may be a server. The server can then forward the message. The message can be sent to a predetermined insurance company with which the location in which the appliance is located is insured comprising information about which appliance has caused the alarm event to be generated. The message may further comprise information on that the inflow of the liquid into the appliance has been shut off. This is advantageous in that the insurance company is notified early, which can be advantageous for the party paying for the insurance in that, e.g., the premium may be decreased.

According to a second aspect, the present invention is realized by a system for reducing overflow caused by an appliance using a liquid. The system comprises: a detector arranged to detect if the appliance has undesirably emitted part of the liquid, an internal server being arranged to generate an alarm event in case the appliance has undesirably emitted part of the liquid, and an external server being arranged to send, via a cellular network, a certificate to a predetermined first party in case an alarm event is generated, wherein the certificate authorizes a first party to enter the location in which the appliance is located.

The advantages of the first aspect are equally applicable to the second aspect. Furthermore, the second aspect can be embodied in the corresponding embodiments of the first aspect.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF PREFERRED EMBODIMENTS OF THE INVENTION

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
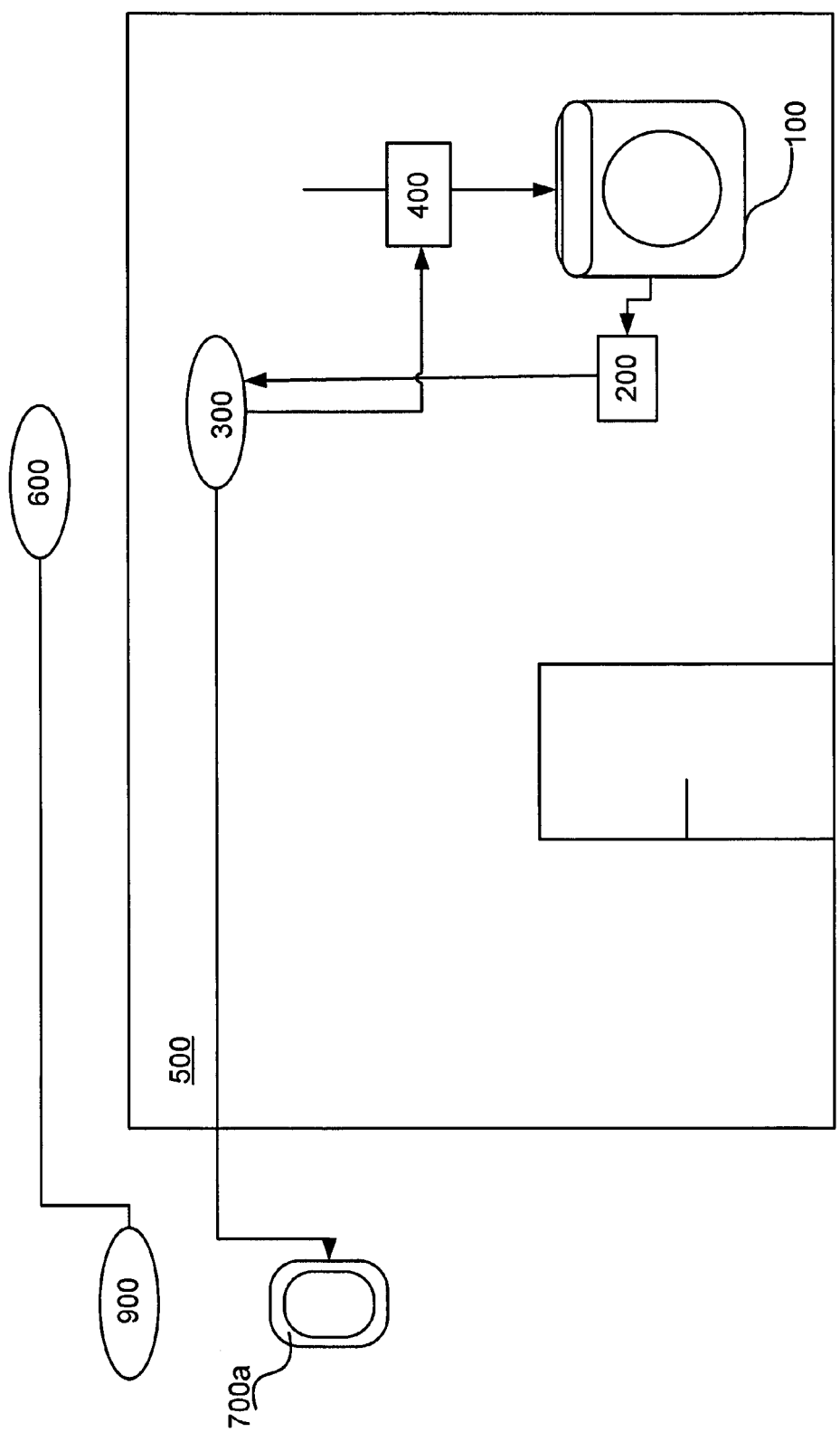
FIG. 1 is a schematic drawing illustrating an embodiment of the inventive system.

FIG. 1 discloses an embodiment of the inventive system for reducing overflow caused by an appliance 100 using a liquid. The system comprises: a detector 200 arranged to detect if the appliance 100 has undesirably emitted part of the liquid, and an internal server 300 being arranged to generate an alarm event in case the appliance has undesirably emitted part of the liquid.

The appliance can be any appliance using a liquid, e.g., a household appliance such as a dishwasher or a washing machine. Alternatively, the appliance may be an oil boiler or a water softening plant. The liquid can, e.g., be water, water mixed with a detergent, oil, or any other liquid suitable to be used in the appliance in question. In FIG. 1, the appliance 100 is a washing machine. The detector 200 and the internal server 300 are arranged to communicate via a short range wireless protocol.

A switch 400 is arranged to shut off an inflow of the liquid into the appliance 100 in case an alarm event is generated, wherein the switch 400 and the internal server 300 are arranged to communicate via the short range wireless protocol. The short range wireless protocol may be at least one from the group of Bluetooth, ZigBee and WLAN.

The switch 400 can, e.g., be arranged at the main inflow pipe so that the inflow of the liquid into the location 500 in which the appliance 100 is located is shut off. Alternatively, the switch 400 can be arranged at the inflow pipe of the appliance 100 so that only the inflow into the appliance 100 is shut off, and not the inflow of the liquid into the location 500 in which the appliance 100 is located. This implies that other appliances at the location 500 can have continued inflows of the liquid although an alarm event has been generated. In FIG. 1, the switch 400 is arranged at the inflow pipe of the appliance 100.

The internal server 300 is arranged to send a message, via a cellular network, to a predetermined party in case an alarm event is generated, wherein said message comprises information about which appliance 100 has caused the alarm event to be generated. This is advantageous in that the predetermined party is notified and can take appropriate action in order to reduce overflow damages. The party may, e.g., be the owner, the tenant, or the landlord of the appliance 100 and/or of the location 500 in which the appliance 100 is located. Alternatively, the party may be a predetermined company, e.g. a craftsman company. As a further alternative, the party may be a server which can forward the message to a predetermined party. Alternatively, the party may be a predetermined mobile communication device, such as, e.g., a mobile phone. In FIG. 1, the message is sent to a mobile communication device 700*a*.

The cellular network may, e.g., be a mobile phone network.

An external server is 600 arranged to send, via the cellular network, a certificate to a predetermined first party 900 in case an alarm event is generated, wherein said certificate authorizes said first party 900 to enter the location 500 in which said appliance 100 is located.

This is advantageous in that the first party 900 is able to reduce overflow damages. The first party may be equal to the previously mentioned predetermined party. The first party 900 may, e.g., be the owner, the tenant, or the landlord of the location 500 in which the appliance 100 is located and/or of the appliance 100. Alternatively, the first party 900 may be a predetermined company, e.g. a craftsman company. As a further alternative, the first party 900 may be a server which can forward the message to a predetermined party. This predetermined party can be the party, chosen from a predetermined list using GPS (Global Positioning System) technique, which is closest to the location 500. This party can, e.g., be in possession of mobile communication device 700*a* and/or 700*b* and the certificate can be sent to one of the mobile communication devices. In FIG. 1, the first party is a first server 900 and the external server 600 is located at a remote location. It is however to be understood that the external server 600 could also be arranged at the location 500 in which the appliance 100 is located.

The predetermined first party may be a craftsman. The craftsman may be a plumber.

The certificate may be limited in time. The certificate may be used in conjunction with a digital authentication key.

The certificate and/or the digital authentication key may further be limited in time. For example, the certificate and/or the digital authentication key may only be valid during business hours or during a specific day. In this way, the method and system may control when a party is allowed to enter the location where the appliance is located.

The external server 600 may further revoke a certificate. As an effect of a certificate being revoked, a mobile communication device 700*a* that previously was authorized to enter a location is not allowed to do so any longer. The external server 600 may thus end an authorization by revoking the corresponding certificate. This is advantageous in that the security is increased. Alternatively, the certificate may be revoked by the first party 900.

The first and/or a second party may as an alternative be selected from a predetermined list based on which party on the list is geographically closest to the location 500 in which the appliance 100 is located. GPS (Global Positioning System) technique can be used to determine which party on the list is geographically closest.

The internal server 300 may be arranged to send a message, via the cellular network, to a predetermined insurance company with which the location 500 in which the appliance 100 is located is insured comprising information about which appliance 100 has caused the alarm event to be generated (not shown). The message may comprise information on that the inflow of the liquid into the appliance 100 has been shut off. This is advantageous in that the insurance company is notified early which can be advantageous for the party paying for the insurance in that, e.g., the premium may be decreased. Furthermore, the message can function as a proof to the insurance company that the insured really has the system for reducing overflow installed at the location 500.

In one embodiment, the system of FIG. 1 may further comprise a lock module 800 (disclosed in FIG. 2) which is arranged at the location 500 in which the appliance 100 is located. A mobile communication device 700*b* is adapted to send a lock/unlock command comprising said certificate to the internal server 300. The internal server 300 is adapted to validate the mobile communication device 700*b*. Furthermore, the internal server 300 is adapted to send a lock/unlock command to the lock module 800 if the internal server 300 validates the mobile communication device 700*b*.

The lock module 800 is adapted to lock/unlock such that the predetermined first party can enter the location 500 in which the appliance 100 is located. The lock/unlock command from the mobile communication device 700*b* to the internal server 300 is sent via the cellular network. This is advantageous in that the first party can enter the location 500 and can reduce overflow damages without having a mechanical key. Sending via the cellular network is advantageous in that the cellular network provides high capacity, reduced power use, large cover area, small interference from other signals, increased security in that it is more difficult to "cut the wire".

In one embodiment, when the mobile communication device 700*b* sends the lock/unlock command comprising said certificate to the internal server 300 the lock/unlock command and/or the certificate is signed with a digital authentication key. The digital authentication key identifies the mobile communication device 700*b*. More specifically, the digital authentication key may comprise information regarding the identity of the mobile communications device by which a lock/unlock command has been signed.

The certificate may further be associated with the digital authentication key. The certificate certifies the authenticity of the digital authentication key. The authenticity is guaranteed by a certificate provider which is associated with the external server 600. The signing key could, e.g., be encrypted with a public key of the certificate provider.

In one embodiment, the lock/unlock command comprising said certificate which is sent from the mobile communication device 700b to the internal server 300 is sent via the external server 600 via the cellular network. If the external server 600 validates the certificate, the external server 600 sends the lock/unlock command to the internal server via the cellular network. This is advantageous in that the system is made even more secure. The mobile communication device 700b does not need to know the IP address of the internal server 300, only the IP address of the external server 600.

In one embodiment, the detector 200 comprises a sensor arranged at an inlet of the appliance 100, said sensor being adapted to detect how much liquid flows into the appliance 100 per unit of time. In this case, the internal server 300 is arranged to compute the amount of liquid that has flown into the appliance 100 at a certain point of time using information from the sensor. The internal server 300 is arranged to generate an alarm event in case the amount of liquid is larger than a predetermined value. The sensor and the internal server 300 are arranged to communicate via a short range wireless protocol.

In an alternative embodiment, the detector 200 comprises a humidity detector for sensing a level of humidity, and the internal server 300 is arranged to generate an alarm event in case the level of humidity is larger than a predetermined value. The humidity sensor can, e.g. be arranged up against the appliance 100, in a floor or in a wall in the vicinity of the appliance 100 or in a room next to the room in which the appliance 100 is located.

In the following, the inventive method will be described with reference to FIGS. 1 and 2.

The detector 200 detects if the appliance 100 has undesirably emitted part of the liquid. In case the appliance 100 has undesirably emitted part of the liquid the internal server 300 generates an alarm event.

The step of generating an alarm event can comprise that a shut off instruction is sent, via a short range wireless protocol, to the switch 400. The switch 400 then shuts off the inflow of the liquid into the appliance 100.

The step of generating an alarm event can comprise: the internal server 300 sending a message, via a cellular network, to a predetermined party, e.g. to the mobile phone 700a of the first party comprising information about which appliance 100 has caused the alarm event to be generated.

The internal server 300 can, e.g., be arranged to send the message receiving a message, or when called. Alternatively, the internal server 300 can send the message at predetermined points of time. As a further alternative, the information about which appliance 100 has caused the alarm event to be generated can be presented in a web interface.

In one embodiment, the appliance 100 can be monitored using a web interface. E.g., the web interface may present information about the appliance. Optionally, at least one network camera imaging the appliance 100 may be arranged at the location 500 and the images may be presented in the web interface.

The step of generating an alarm event can comprise: sending a certificate, via the cellular network, to a predetermined first party 900, wherein said certificate authorizes said second party to enter the location 500 comprising said appliance 100. The certificate is preferably sent by a server. This server could, e.g., be the server 600 and/or the server 300.

The predetermined first party can be a craftsman.

The step of generating an alarm event can comprise: sending a message, via the cellular network, to a predetermined insurance company with which the location 500 in which the appliance 100 is located is insured comprising information about which appliance 100 has caused the alarm event to be generated.

The message can further comprise information on that the inflow of the liquid into the appliance 100 has been shut off.

Figure 2:
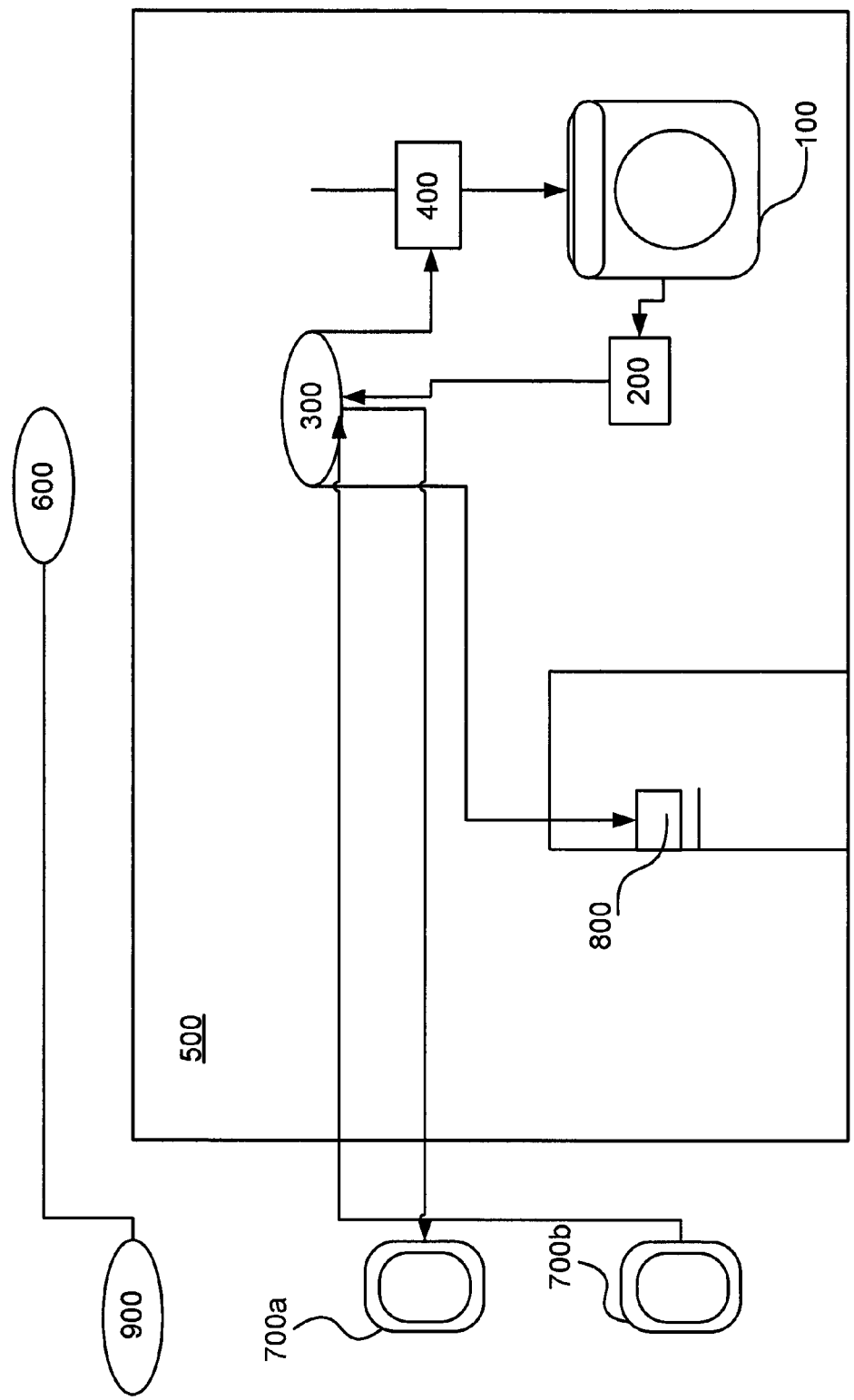
FIG. 2 is a schematic drawing illustrating an embodiment of the inventive system.

In FIG. 2, the predetermined second party sends a lock/unlock command comprising said certificate from the mobile communication device 700b to the internal server 300. If the internal server 300 validates the mobile communication device 700b, the internal server 300 sends a lock/unlock command to the lock module 800 arranged at the location 500 in which the appliance 100 is located. The lock module 800 locks/unlocks so that the predetermined second party can enter the location 500, wherein the lock/unlock command from the mobile communication device 700b to the internal server 300 is sent via a cellular network.

The step of detecting if the appliance 100 has undesirably emitted part of the liquid can comprise: detecting how much liquid flows into the appliance 100 per unit of time and sending the detected information, via the short range wireless protocol, to the internal server 300, computing, in the internal server 300, the amount of liquid that has flown into the appliance 100 at a certain point of time. The step of generating an alarm event if the appliance 100 has emitted part of the liquid can then comprise: generating an alarm event in case the amount of liquid that has flown into the appliance 100 at a certain point of time is larger than a predetermined value.

Alternatively, the step of detecting if the appliance 100 has undesirably emitted part of the liquid can comprise: sensing in a humidity detector a level of humidity. The step of generating an alarm event if the appliance 100 has emitted part of the liquid can then comprise: generating an alarm event in case the level of humidity is larger than a predetermined value.

It is to be noted that all combinations of the different embodiments of the system and the method are possible. The skilled person realizes that a location 500 can have several appliances 100. Furthermore, a location can have several lock modules 800. Additionally, the internal server 300 can be arranged to communicate with several lock modules 800, several detectors 200, several switches 400, and several parties and/or mobile communication devices 700a and 700b.

In the following, it will be described what happens when an appliance 100 using a liquid undesirably emits part or the liquid with reference to FIGS. 1 and 2.

The appliance 100 emits part of the liquid. The detector 200 detects that the appliance 100 has undesirably emitted part of the liquid. If the detector 200 is a humidity detector, the detected level of humidity is sent to the internal server 300 via the short range wireless protocol. The internal server 300 compares the received level of humidity with a predetermined value and generates an alarm event if the received level of humidity is larger than a predetermined value. If the detector 200 is a sensor arranged at an inlet of the appliance 100, the sensor detects how much liquid flows into the appliance 100 per unit of time and sends the detected values to the internal server 300 via the short range protocol. The internal server 300 computes the amount of liquid that has flown into the appliance 100 at a certain point of time using the information from the sensor. In case the computed amount of liquid is larger than a predetermined value, the internal server 300 generates an alarm event. The internal server 300 sends a message to the external server 600 comprising information on that an alarm event has been generated and which appliance 100 caused the alarm event to be generated.

In response to the alarm event, the external server 600 sends a certificate to a predetermined first party 900. The predetermined first party 900 consults a predetermined list comprising several parties (e.g., the persons carrying mobile communication devices 700*a* and 700*b*). GPS (Global Positioning System) technique is used to determine which party is the closest to the location 500. The first party 900 forwards the certificate to the mobile communication device 700*b* which here is the closest to the location 500. The mobile communication device sends an unlock command to the external server 600. The unlock command comprises the certificate and a digital authentication key. The external server 600 routes the unlock command to the correct internal server, in this case server 300. If the server 300 validates the certificate, the internal server 300 sends an unlock command to the lock module 800. The lock module 800 unlocks and the person holding the mobile communication device 700*b* can enter the location.

In response to the alarm event, the internal server 300 sends a shut off instruction to the switch 400. The switch 400 then shuts off the inflow of the liquid into the appliance 100. Furthermore, a message is sent to mobile communication device 700*a*, to the owner of the appliance 100, saying that appliance 100 has caused an alarm event to be generated.

The method and system according to the invention may, mutatis mutandis, be used in association with other types of undesired events. For example, the method and system may be used for reducing the impact, or consequences, of an undesired event. Other types of undesired events may, for example, be a fire, a burglary, or an accident of an elderly or other person. In such a situation the method may relate to detecting the occurrence of the undesired event. For example, the system may comprise a detector which is arranged to detect an undesired event. In case the undesired event is a fire, the detector may be a smoke detector. In case the undesired event is a fall accident, the detector may be a fall detector or an alarm system used by an elderly or other person. The method may further comprise generating, by the internal server, an alarm event if the undesired event has occurred. In response to the detection of the undesired event and generation of the alarm event, a certificate may be sent to a predetermined first party in the manner provided by embodiments of the invention.

The invention claimed is:

1. A method for reducing overflow caused by an appliance using a liquid, the method comprising:
   detecting if the appliance has undesirably emitted part of the liquid,
   generating an alarm event if the appliance has undesirably emitted part of the liquid,
   sending a certificate, via a cellular network, to a predetermined first party, wherein said certificate, upon said predetermined first party sending a lock/unlock command comprising said certificate, authorizes said first party to enter the location in which said appliance is located, and
   sending a digital authentication key for signing of said lock/unlock command comprising said certificate to said first party, wherein the certificate is associated with the digital authentication key, the certificate certifies the authenticity of the digital authentication key, and the digital authentication key comprises information identifying the first party,
   wherein the predetermined first party is a first server and wherein the method further comprises:
   the first server selecting a second party from a predetermined list, and
   the first server forwarding the certificate to the second party;
   wherein the selecting from the predetermined list is based on which party on the list is geographically closest to the location in which the appliance is located using Global Positioning System technique.

2. The method according to claim 1, further comprising:
   sending the lock/unlock command comprising said certificate from a mobile communication device to an internal server,
   if the internal server validates the mobile communication device:
   the internal server sending a lock/unlock command to a lock module arranged at the location in which the appliance is located,
   the lock module locking/unlocking so that the predetermined first party can enter the location,
   wherein the lock/unlock command from the mobile communication device to the internal server is sent via a cellular network.

3. The method according to any claim 1, wherein the certificate is limited in time.

4. The method according to claim 1, further comprising:
   revoking the certificate which has been sent to the predetermined first party.

5. The method according to claim 4, wherein the revoking of the certificate is performed by the internal server or by the predetermined first party.

6. The method according to claim 2, further comprising:
   signing the lock/unlock command and/or the certificate with the digital authentication key.

7. The method according to claim 1, wherein the step of detecting if the appliance has undesirably emitted part of the liquid comprises:
   sensing in a humidity detector a level of humidity, and
   wherein the step of generating an alarm event if the appliance has emitted part of the liquid is generating an alarm event in case the level of humidity is larger than a predetermined value.

8. The method according to claim 1, wherein the step of detecting if the appliance has undesirably emitted part of the liquid is:
   detecting how much liquid flows into the appliance per unit of time and sending the detected information, via a short range wireless protocol, to the internal server,
   computing the amount of liquid that has flown into the appliance at a certain point of time, and
   wherein the step of generating an alarm event if the appliance has undesirably emitted part of the liquid is generating an alarm event in case the amount of liquid that has flown into the appliance at a certain point of time is larger than a predetermined value.

9. The method according to claim 8, wherein the step of generating an
   alarm event comprises:
   sending a shut off instruction, via the short range wireless protocol, to a switch for operating an inflow of the liquid into the appliance, and
   the switch shutting off the inflow of the liquid into the appliance.

10. The method according to claim 1, wherein the step of generating an alarm event comprises:
    sending a message, via the cellular network, to a predetermined third party comprising information about which appliance has caused the alarm event to be generated.

11. A system for reducing overflow caused by an appliance using a liquid, the system comprises:
- a detector arranged to detect if the appliance has undesirably emitted part of the liquid,
- an internal server being arranged to generate an alarm event in case the appliance has undesirably emitted part of the liquid, and
- an external server being arranged to send, via a cellular network, a certificate to a predetermined first party in case an alarm event is generated, wherein said certificate, upon said predetermined first party
- sending a lock/unlock command comprising said certificate to said internal server,
- authorizes said first party to enter the location in which said appliance is located, and to send a digital authentication key for signing of said lock/unlock command comprising said certificate to said first party,
- wherein the certificate is associated with the digital authentication key,
- the certificate certifies the authenticity of the digital authentication key, and
  - the digital authentication key comprises information identifying the first party,
- wherein the predetermined first party is a first server,
- the first server being arranged to select a second party from a predetermined list, and
- the first server being arranged to forward the certificate to the second party;
- wherein the first server is arranged to select the party on the list that is geographically closest to the location in which the appliance is located using Global Positioning System technique.

12. The system according to claim 11, further comprising a mobile communication device, and a lock module arranged at the location in which the appliance is located,
- the mobile communication device being adapted to send a lock/unlock command comprising said certificate to the internal server,
- the internal server being adapted to validate the mobile communication device,
- the internal server being adapted to send a lock/unlock command to the lock module if the internal server validates the mobile communication device,
- the lock module being adapted to lock/unlock such that the predetermined first party can enter the location in which the appliance is located,
- wherein the lock/unlock command from the mobile communication device to the internal server is adapted to be sent via a cellular network.

13. A method for reducing overflow caused by an appliance using a liquid, the method comprising:
- detecting if the appliance has undesirably emitted part of the liquid,
- generating an alarm event if the appliance has undesirably emitted part of the liquid,
- sending a certificate, via a cellular network, to a predetermined first party, wherein said certificate, upon said predetermined first party sending a lock/unlock command comprising said certificate, authorizes said first party to enter the location in which said appliance is located, and
- sending a digital authentication key for signing of said lock/unlock command comprising said certificate to said first party, wherein the certificate is associated with the digital authentication key, the certificate certifies the authenticity of the digital authentication key, and the digital authentication key comprises information identifying the first party,
- wherein the step of detecting if the appliance has undesirably emitted part of the liquid is:
- detecting how much liquid flows into the appliance per unit of time and sending the detected information, via a short range wireless protocol, to an internal server,
- computing the amount of liquid that has flown into the appliance at a certain point of time, and
- wherein the step of generating an alarm event if the appliance has undesirably emitted part of the liquid is generating an alarm event in case the amount of liquid that has flown into the appliance at a certain point of time is larger than a predetermined value.

14. The method according to claim 13, wherein the step of generating an alarm event comprises:
- sending a shut off instruction, via the short range wireless protocol, to a switch for operating an inflow of the liquid into the appliance, and
- the switch shutting off the inflow of the liquid into the appliance.

* * * * *